(12) United States Patent
Sridharan

(10) Patent No.: US 12,506,517 B2
(45) Date of Patent: Dec. 23, 2025

(54) INTEGRATED SINGLE-CHIP BEAMFORMING SYSTEM

(71) Applicant: Qorvo Texas, LLC, Richardson, TX (US)

(72) Inventor: Kartik Sridharan, San Diego, CA (US)

(73) Assignee: Qorvo Texas, LLC, Richardson, TX (US)

( * ) Notice: Subject to any disclaimer, the term of this patent is extended or adjusted under 35 U.S.C. 154(b) by 0 days.

(21) Appl. No.: 18/664,658

(22) Filed: May 15, 2024

(65) Prior Publication Data

US 2025/0088219 A1    Mar. 13, 2025

Related U.S. Application Data

(60) Provisional application No. 63/466,544, filed on May 15, 2023.

(51) Int. Cl.
*H04B 7/04* (2017.01)
*H04B 7/185* (2006.01)

(52) U.S. Cl.
CPC ........... *H04B 7/04* (2013.01); *H04B 7/18513* (2013.01)

(58) Field of Classification Search
CPC ..... H04B 7/04; H04B 7/18513; H04B 7/0617
See application file for complete search history.

(56) References Cited

U.S. PATENT DOCUMENTS

2007/0291883 A1* 12/2007 Welz .................. H04B 1/30
                                                    375/350
2011/0069767 A1*  3/2011 Zhu .................... H04L 27/368
                                                    375/259

* cited by examiner

*Primary Examiner* — Sung S Ahn
(74) *Attorney, Agent, or Firm* — Haynes and Boone, LLP

(57) ABSTRACT

An integrated beamforming integrated circuit/system that combines beamforming circuitry, transceiver circuitry, synthesizer circuitry, a frequency-dependent quadrature (FDIQ) calibration system, and an error vector calibration system on a single chip for analog, hybrid, or digital beamforming.

20 Claims, 14 Drawing Sheets

INTEGRATED SINGLE-CHIP BEAMFORMING SYSTEM

CROSS-REFERENCE TO RELATED APPLICATION(S)

This patent application claims the benefit of U.S. Provisional Patent Application No. 63/466,544 entitled INTEGRATED SINGLE-CHIP BEAMFORMING SYSTEM filed May 15, 2023, which is hereby incorporated herein by reference in its entirety.

FIELD OF THE INVENTION

The invention generally relates to an integrated single-chip beamforming system.

BACKGROUND OF THE INVENTION

The feasibility of future all or partial digital beamforming systems will depend in large part on the ability to carefully control a wide range of operating parameters.

SUMMARY OF VARIOUS EMBODIMENTS

In accordance with one embodiment of the invention, an integrated circuit (IC) for analog, hybrid, or digital beamforming comprises beamforming circuitry; transceiver circuitry; synthesizer circuitry; a frequency-dependent quadrature (FDIQ) calibration system configured to compensate for frequency-dependent quadrature (I/Q) imbalances due to at least one environmental factor; and an error vector (EV) calibration system configured to compensate for time-varying phase changes due to at least one environmental factor.

In various alternative embodiments, the at least one environmental factor may include temperature, voltage, and/or frequency and may include a combination of two or more environmental factors. The FDIQ calibration system may include a blind adaptive calibration circuit to adapt receive image compensation coefficients, in which case transmit signals from a transmit path are provided to the blind adaptive calibration circuit through a 0 degree path or a 90 degree path. The EV calibration system may store a primary phase calibration parameter for programming an initial phase setting and secondary phase calibration parameters for making phase calibration adjustments based on changes in the one or more environmental factors, in which case the secondary phase calibration parameters may be stored in at least one look-up table. In certain embodiments, the transceiver circuitry may include a plurality of RF communication circuits, each having a phase shifter and a mixer that modulates a carrier signal to produce a modulated signal that is distributed to the plurality of RF communication circuits, wherein the phase shifter of each RF communication circuit is programmed with a primary calibration parameter for calibration of the RF communication circuit; the mixer is programmed with a primary calibration parameter for calibration of the mixer based on phase outputs of the RF communication circuits; and at least one of (a) a phase shifter or (b) the mixer is reprogrammed using the secondary calibration parameters based on changes of the at least one environmental factor. The mixer may be calibrated based on an average phase difference of the RF communication circuits relative to an external reference.

In various embodiments, the IC may be configured to operate with 5G protocols and/or to operate with millimeter wave signals. The transceiver circuitry may include a plurality of transceivers that are compensated independently or collectively. The IC may be a BFIC, IFIC, or CDIC.

Additional embodiments may be disclosed and claimed.

BRIEF DESCRIPTION OF THE DRAWINGS

Those skilled in the art should more fully appreciate advantages of various embodiments of the invention from the following "Description of Illustrative Embodiments," discussed with reference to the drawings summarized immediately below.

It should be noted that the foregoing figures and the elements depicted therein are not necessarily drawn to consistent scale or to any scale. Unless the context otherwise suggests, like elements are indicated by like numerals. The drawings are primarily for illustrative purposes and are not intended to limit the scope of the inventive subject matter described herein.

DESCRIPTION OF ILLUSTRATIVE EMBODIMENTS

Definitions. As used in this description and the accompanying claims, the following terms shall have the meanings indicated, unless the context otherwise requires:

A "set" includes one or more members.

A "beam forming element" (sometimes referred to simply as an "element" or "radiating element") is an element that is used to transmit and/or receive a signal for beam forming. Different types of beam forming elements can be used for different beam forming applications. For example, the beam forming elements may be radio frequency (RF) antennas for RF applications (e.g., radar, wireless communication system such as 5G applications, satellite communications, etc.), ultrasonic transducers for ultrasound applications, optical transducers for optical applications, microphones and/or speakers for audio applications, etc. Typically, the signal provided to or from each beam forming element is independently adjustable, e.g., as to gain/amplitude and phase.

A "beam-formed signal" is a signal produced by or from a plurality of beam forming elements. In the context of the present invention, there is no requirement that a beam-formed signal have any particular characteristics such as directionality or coherency.

A "phased array system" is a system that includes a plurality of beam forming elements and related control logic for producing and adapting beam-formed signals.

The terms "environmental factor" and "environmental factor value" can relate to a single environmental factor (e.g., temperature, voltage, frequency, etc.) or a combination of environmental factors (e.g., temperature and voltage, temperature and frequency, voltage and frequency, temperature and voltage and frequency, etc.).

For convenience, the term "beam forming" is sometimes abbreviated herein as "BF."

Various embodiments are described herein in the context of active electronically steered antenna (AESA) systems also called Active Antenna, although the present invention is in no way limited to AESA systems. AESA systems form electronically steerable beams that can be used for a wide variety of applications. Although certain details of various embodiments of an AESA system are discussed below, those skilled in the art can apply some embodiments to other AESA systems. Accordingly, discussion of an AESA system does not necessarily limit certain other embodiments.

Figure 1:
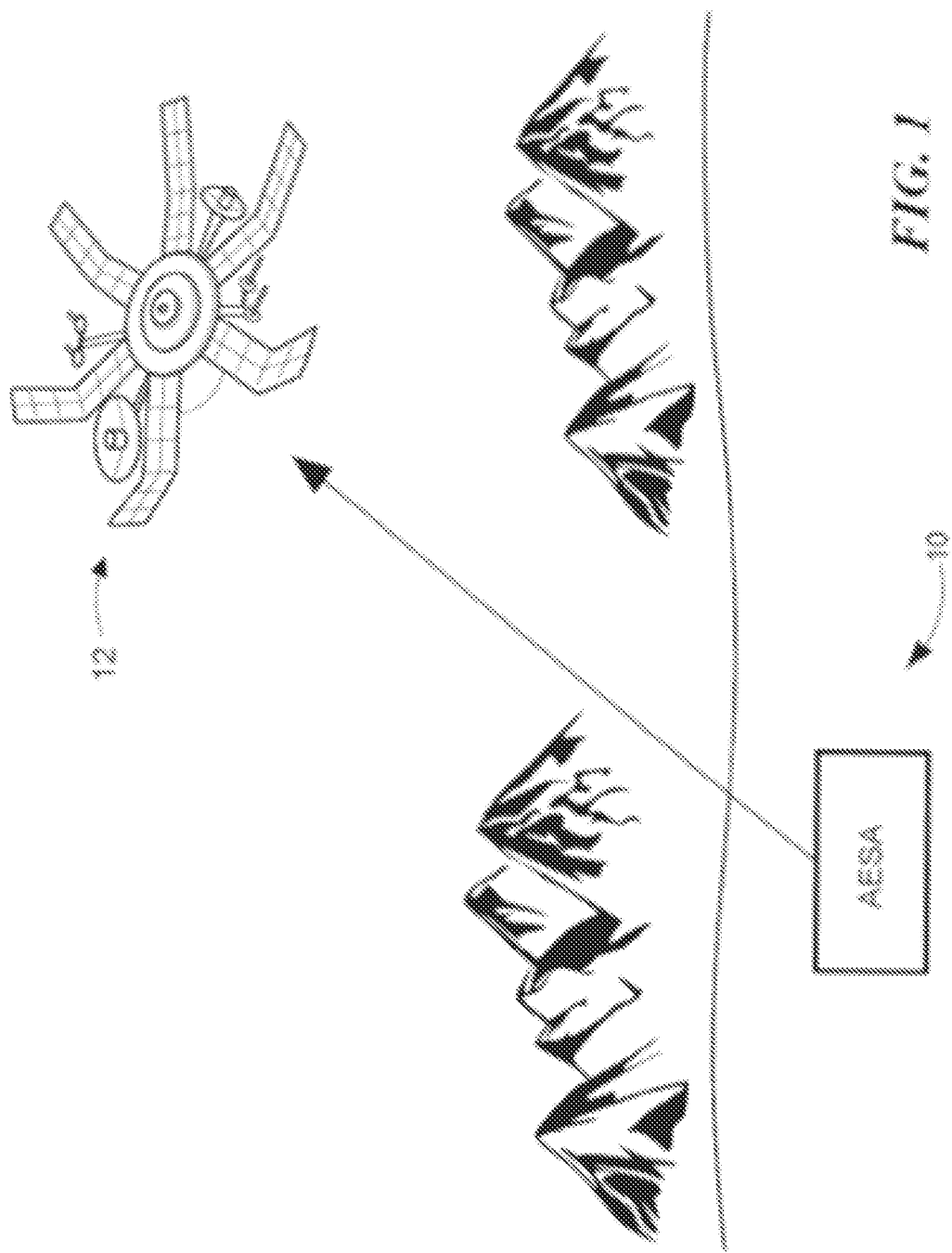
FIG. 1 schematically shows an active electronically steered antenna system ("AESA system") configured in accordance with certain illustrative embodiments of the invention and communicating with an orbiting satellite.

FIG. 1 schematically shows an active electronically steered antenna system ("AESA system 10") configured in accordance with certain illustrative embodiments of the invention and communicating with an orbiting satellite 12. A phased array (discussed in more detail below and referenced as phased array 10A) implements the primary functionality of the AESA system 10. Specifically, as known by those skilled in the art, the phased array forms one or more of a plurality of electronically steerable beams that can be used for a wide variety of applications. As a satellite communication system, for example, the AESA system 10, preferably is configured operate at one or more satellite frequencies. Among others, those frequencies may include the Ka-band, Ku-band, and/or X-band. Of course, as satellite communication technology progresses, future implementations may modify the frequency bands to communicate using new satellite frequencies.

Figure 2:
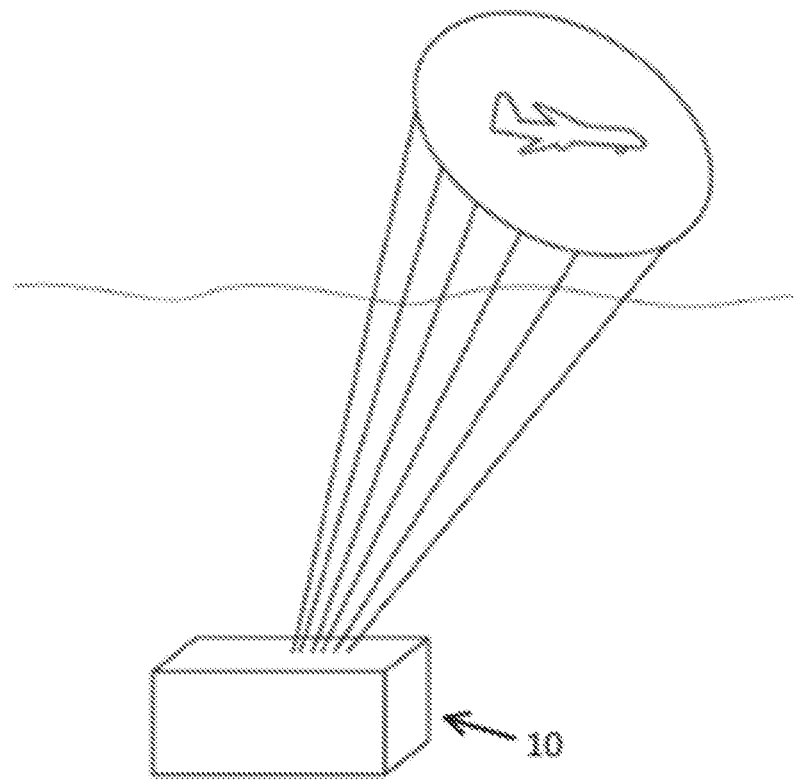
FIG. 2 schematically shows an AESA system configured in accordance with certain illustrative embodiments of the invention and implemented as a radar system in which a beam-formed signal may be directed toward an aircraft or other object in the sky (e.g., to detect or track position of the object).

FIG. 2 schematically shows an AESA system 10 configured in accordance with certain illustrative embodiments of the invention and implemented as a radar system in which a beam-formed signal may be directed toward an aircraft or other object in the sky (e.g., to detect or track position of the object).

Figure 3:
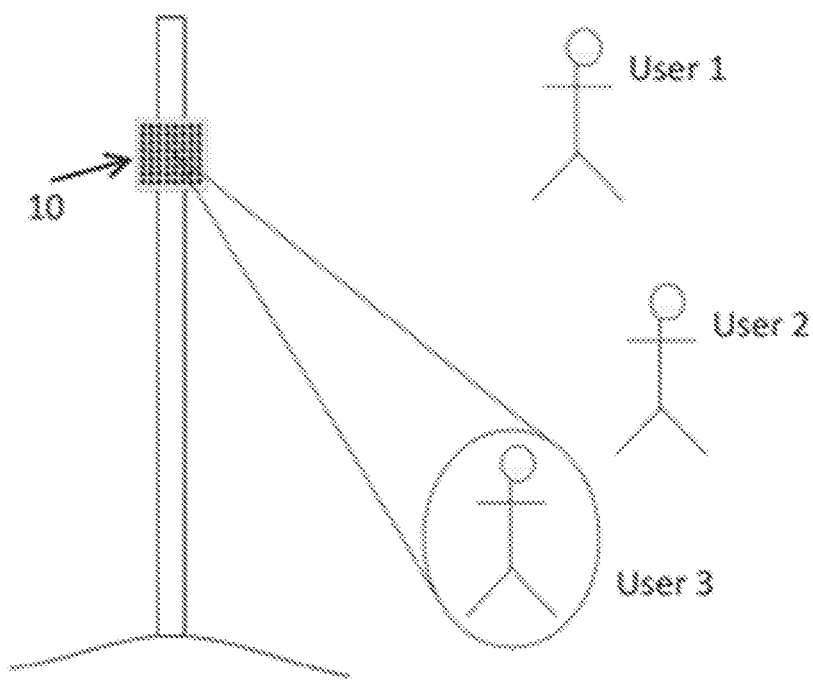
FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells).

FIG. 3 schematically shows an AESA system 10 configured in accordance with certain illustrative embodiments of the invention and implemented as a wireless communication system (e.g., 5G) in which a beam-formed signal may be directed toward a particular user (e.g., to increase the effective transmit range of the AESA system or to allow for greater frequency reuse across adjacent or nearby cells). Of course, other implementations may include other types of wireless communication systems.

Of course, those skilled in the art use AESA systems 10 and other phased array systems in a wide variety of other applications, such as RF communication, optics, sonar, ultrasound, etc. Accordingly, discussion of satellite, radar, and wireless communication systems are not intended to limit all embodiments of the invention.

The satellite communication system may be part of a cellular network operating under a known cellular protocol, such as the 3G, 4G (e.g., LTE), or 5G protocols. Accordingly, in addition to communicating with satellites, the system may communicate with earth-bound devices, such as smartphones or other mobile devices, using any of the 3G, 4G, or 5G protocols. As another example, the satellite communication system may transmit/receive information between aircraft and air traffic control systems. Of course, those skilled in the art may use the AESA system 10 in a wide variety of other applications, such as broadcasting, optics, radar, etc. Some embodiments may be configured for non-satellite communications and instead communicate with other devices, such as smartphones (e.g., using 4G or 5G protocols). Accordingly, discussion of communication with orbiting satellites 12 is not intended to limit all embodiments of the invention.

The AESA system 10 typically includes a number of integrated circuits for generating transmit signals and/or processing receive signals. For convenience, such integrated circuits used in RF applications may be referred to herein generally as RFICs. In certain exemplary embodiments, the AESA system 10 includes X beam forming RF integrated circuits (BFICs), with each BFIC supporting Y beam forming elements (e.g., 2 or 4 beam forming elements per BFIC, although not limited to 2 or 4). Thus, such a phased array generally includes (X*Y) beam forming elements.

Figure 4:
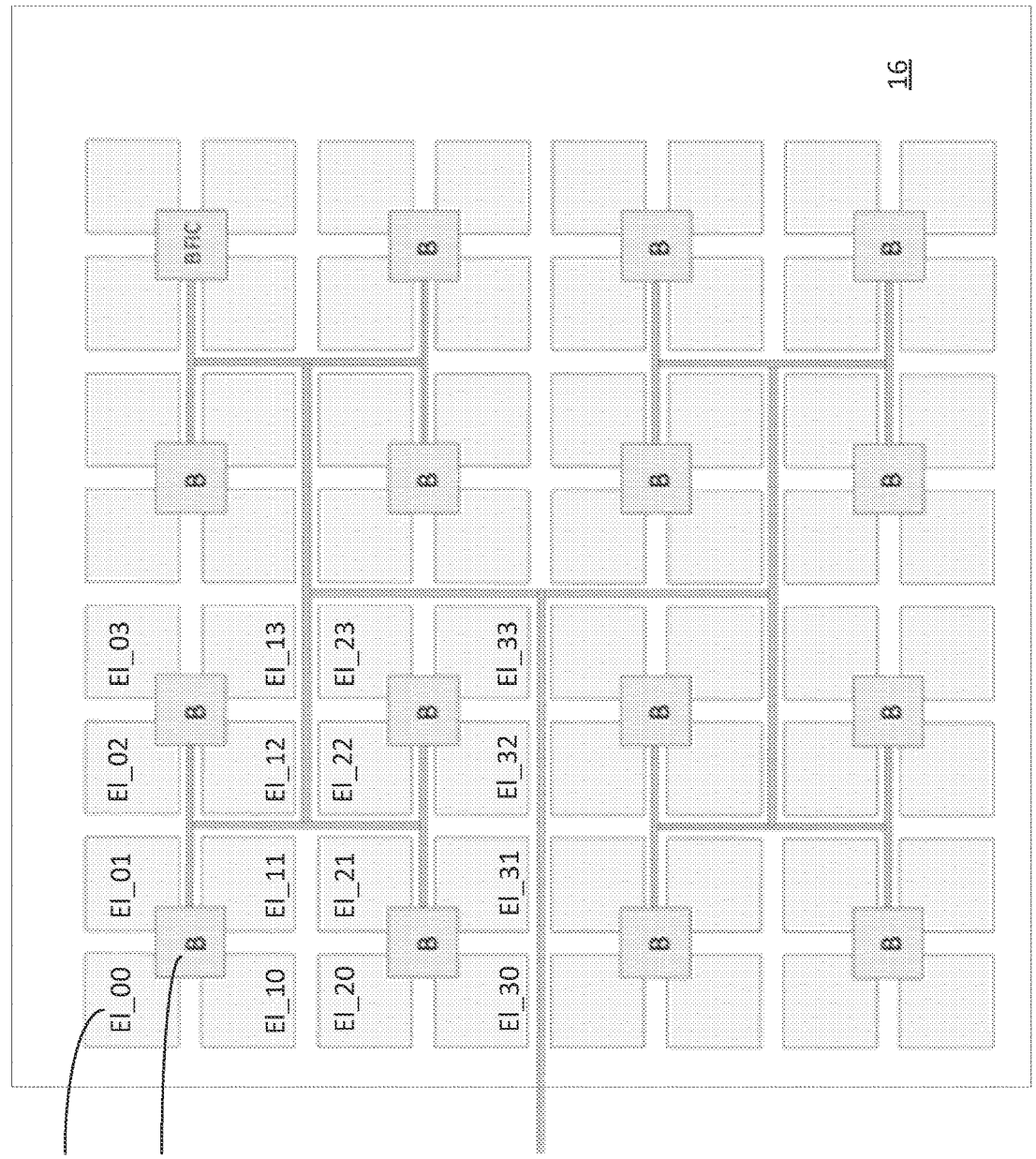
FIG. 4 is a schematic diagram showing a plan view of a portion of an AESA system in which each beam forming integrated circuit is connected to four beam forming elements, in accordance with illustrative embodiments of the invention.

FIG. 4 is a schematic diagram showing a plan view of a portion 10A of an AESA system 10 in which each beam forming integrated circuit 14 (labeled "BFIC" or "B") is connected to four beam forming elements 18, in accordance with illustrative embodiments of the invention. Each BFIC 14 aggregates signals to/from its connected beam forming elements 18 as part of a common beam forming signal 25. In certain exemplary embodiments, the beam forming elements 18 may be implemented as patch antennas that are formed on one side of a laminar printed circuit board, although it should be noted that the present invention is not limited to patch antennas or to a laminar printed circuit board.

Preferably, the AESA system 10A of FIG. 4 is implemented as a laminar phased array having a laminated printed circuit board 16 acting as the substrate supporting the above noted plurality of beam forming elements 18 and beam forming integrated circuits 14. The elements 18 preferably are formed as a plurality of square or rectangular patch antennas oriented in a patch array configuration with the beam forming elements 18 that are physically or logically arranged in rows and columns (e.g., the element in row 0 column 0 is labeled El_00, the element in row 0 column 1 is labeled El_01, etc.), and this type of arrangement will be used below as a frame of reference in discussing various exemplary embodiments. However, it should be noted that other embodiments may use other patch configurations, such as a triangular configuration in which each integrated circuit is connected to three elements 18, a pentagonal configuration in which each integrated circuit is connected to five elements 18, or a hexagonal configuration in which each integrated circuit is connected to six elements 18. Like other similar phased arrays, the printed circuit board 16 also may have a ground plane (not shown) that electrically and magnetically cooperates with the elements 18 to facilitate operation. In exemplary embodiments, the BFICs are mounted to a back side of the printed circuit board opposite the side containing the patch antennas (e.g., with through-PCB vias and traces that connect to the elements 18, with such connections typically made using impedance controlled lines and transitions), although in alternative embodiments, the BFICs may be mounted to the same side of the printed circuit board as the patch antennas.

As a patch array, the elements 18 have a low profile. Specifically, as known by those skilled in the art, a patch antenna (i.e., the element 18) typically is mounted on a flat surface and includes a flat rectangular sheet of metal (known as the patch and noted above) mounted over a larger sheet of metal known as a "ground plane." A dielectric layer between the two metal regions electrically isolates the two sheets to prevent direct conduction. When energized, the patch and ground plane together produce a radiating electric field. Illustrative embodiments may form the patch antennas using conventional semiconductor fabrication processes, such as by depositing one or more successive metal layers on the printed circuit board 16. Accordingly, using such fabrication processes, each element 18 in the phased array 10A should have a very low profile. It should be noted that embodiments of the present invention are not limited to rectangular-shaped elements 18 but instead any appropriate shape such as circular patches, ring resonator patches, or other shape patches may be used in other particular embodiments.

The phased array 10A can be configured for transmit-only, receive-only, or dual-mode (i.e., transmit and receive) operation. In a dual mode configuration, the phased array 10A generally will be in either a transmit mode or a receive mode at any given time, although technically it may be possible to have different portions of the phased array 10A operating in different modes at the same time.

The AESA system 10 has a plurality of the above noted beam forming integrated circuits 14 for controlling operation of the elements 18. Those skilled in the art sometimes refer to these integrated circuits 14 as "beam steering integrated circuits." Each integrated circuit 14 preferably is configured with at least the minimum number of functions to accomplish the desired effect. Indeed, integrated circuits 14 for dual mode (transmit and receive) elements 18 are expected to have some different functionality than that of the integrated circuits 14 for transmit-only operation or receive-only operation. Accordingly, integrated circuits 14 for such non-dual-mode elements 18 may have a smaller footprint than the integrated circuits 14 that control the dual-mode elements 18. Despite that, some or all types of integrated circuits 14 fabricated for the phased array 10A can be modified to have a smaller footprint.

As an example, depending on its role in the phased array 10A, each integrated circuit 14 may include some or all of the following functions:
phase shifting,
amplitude controlling/beam weighting,
switching between transmit mode and receive mode,
output amplification to amplify output signals to the elements 18,
input amplification for received RF signals (e.g., signals received from the satellite 12), and
power combining/summing and splitting between elements 18.

Indeed, some embodiments of the integrated circuits 14 may have additional or different functionality, although illustrative embodiments are expected to operate satisfactorily with the above noted functions. Those skilled in the art can configure the integrated circuits 14 in any of a wide variety of manners to perform those functions. For example, the input amplification may be performed by a low noise amplifier, the phase shifting may use conventional active phase shifters, and the switching functionality may be implemented using conventional transistor-based switches. Additional details of the structure and functionality of integrated circuits 14 are discussed below.

In illustrative embodiments, each integrated circuit 14 supports multiple elements 18, thus reducing the required total number of integrated circuits 14 in a given AESA system 10. This reduced number of integrated circuits 14 correspondingly reduces the cost of the AESA system 10. In addition, more surface area on the printed circuit board 16 may be dedicated to the elements 18 and/or to other components.

To that end, each integrated circuit 14 preferably operates on at least one element 18 in the array and typically operates on a plurality of elements 18. For example, as discussed above, one integrated circuit 14 can operate on two, three, four, five, six, or more different elements 18. Of course, those skilled in the art can adjust the number of elements 18 sharing an integrated circuit 14 based upon the application. For example, a single integrated circuit 14 can control two elements 18, three elements 18, four elements 18, five elements 18, six elements 18, seven elements 18, eight elements 18, etc., or some range of elements 18. Sharing the integrated circuits 14 between multiple elements 18 in this manner reduces the required total number of integrated circuits 14, which can correspondingly reduce the required size of the printed circuit board 16 and cost of the system.

As noted above, in certain embodiments, the phased array 10A may alternately and selectively operate in a transmit mode or a receive mode. To that end, the integrated circuits 14 may generate time division diplex or duplex waveforms so that a single aperture or phased array 10A can be used for both transmitting and receiving. In a similar manner, some embodiments may eliminate a commonly included transmit/receive switch in the side arms of the integrated circuit 14. Instead, such embodiments may duplex at the elements 18. This process can be performed by isolating one of the elements 18 between transmit and receive by an orthogonal feed connection. Such a feed connection may eliminate about a 0.8 dB switch loss and improve G/T (i.e., the ratio of the gain or directivity to the noise temperature) by about 1.3 dB for some implementations.

Generally speaking, RF interconnect and/or beam forming lines (not shown in FIG. 4) electrically connect each integrated circuit 14 to its respective elements 18. Illustrative embodiments mount the integrated circuits 14 as close to their respective elements 18 as possible in order to reduce or minimize feed loss through these connections. Specifically, this close proximity preferably reduces RF interconnect line lengths, reducing the feed loss. To that end, each integrated circuit 14 preferably is packaged either in a flip-chipped configuration using wafer level chip scale packaging (WLCSP) or other configuration such as extended wafer level ball-grid-array (eWLB) that supports flip chip, or a traditional package, such as quad flat no-leads package (QFN package).

It should be reiterated that although FIG. 4 shows an exemplary phased array 10A with some specificity (e.g., specific layouts of the elements 18 and integrated circuits 14), those skilled in the art may apply illustrative embodiments to other implementations. For example, each integrated circuit 14 can connect to more or fewer elements 18, or the lattice configuration can be different. Accordingly, discussion of the specific configurations of the AESA system 10 shown in FIG. 4 is for convenience only and not intended to limit all embodiments.

Figure 5:
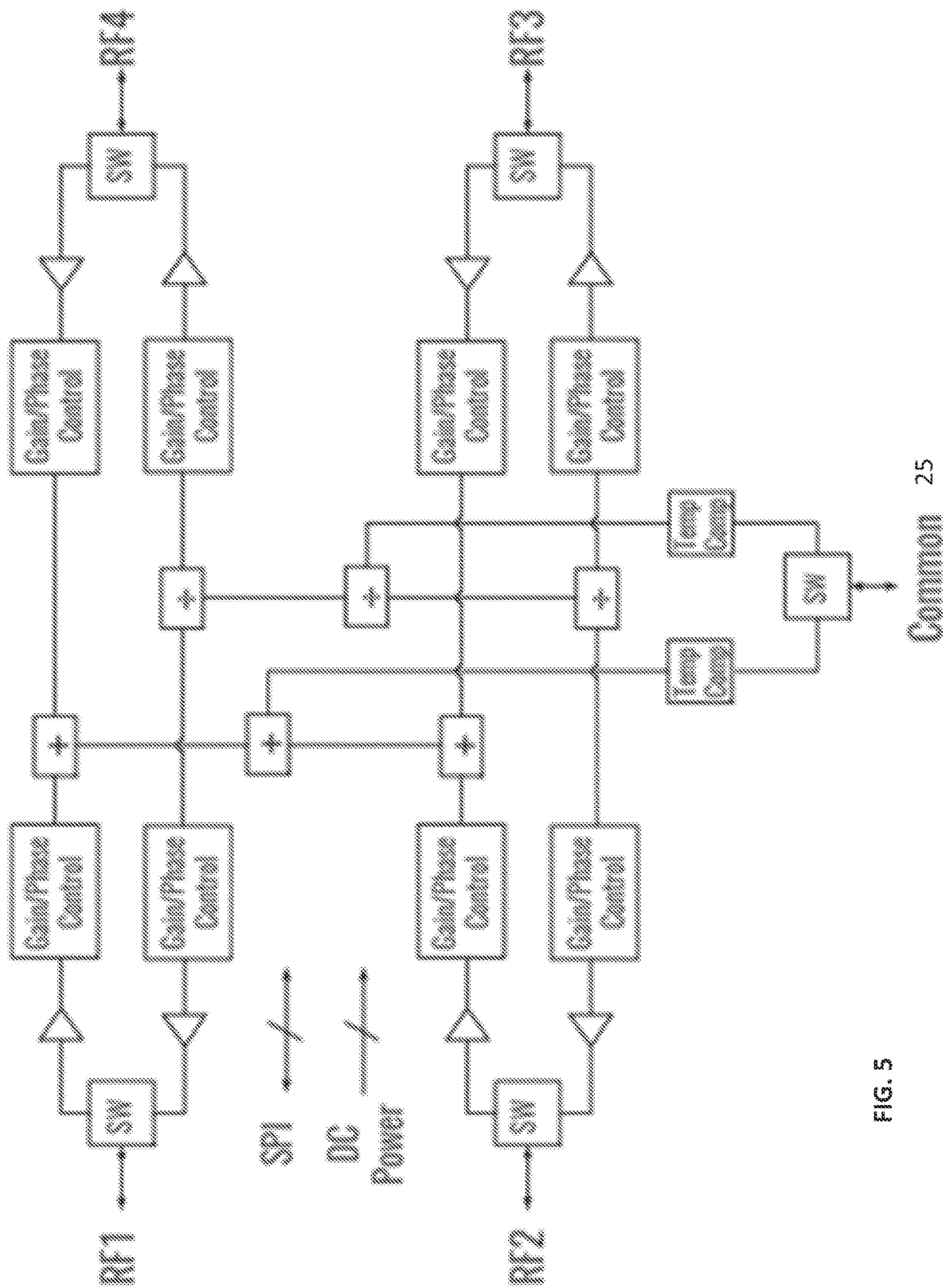
FIG. 5 is a schematic diagram showing relevant components of a BFIC chip configured to support four beam forming elements, in accordance with one exemplary embodiment.

FIG. 5 is a schematic diagram showing relevant components of a BFIC chip configured to support four beam forming elements 18, in accordance with one exemplary embodiment. The BFIC chip here includes a common port and four RF ports. In this exemplary embodiment, the BFIC chip supports both transmit and receive modes, which can be controlled via various switches (SW). Specifically, each RF port is associated with a transmit signal path including a transmit gain/phase control circuit and a receive signal path including a receive gain/phase control circuit. The transmit and receive gain/phase control circuits can be switched into and out of the common beam forming signal 25 via the switches. The transmit gain/phase control circuit typically includes a variable gain amplifier (VGA), an adjustable phase circuit (Ø), and a power amplifier (PA) stage. The receive gain/phase control circuit typically includes a low noise amplifier (LNA) stage, an adjustable phase circuit (Ø), and a variable gain amplifier (VGA). In the transmit mode, common transmit signals 25 presented on the common port are distributed to the transmit gain/phase control circuits, which output transmit signals to their respective RF ports (e.g., to beam forming elements 18). In the receive mode, receive signals from the RF ports (e.g., from beam forming elements 18) are processed by the respective receive gain/phase control circuits and are combined to output combined receive signals 25 on the common port.

Certain exemplary embodiments can include other types of RFICs. For example, in certain exemplary embodiments, signals to/from a number of BFIC chips can be aggregated by a conditioning integrated circuit (CDIC) chip or an interface integrated circuit (IFIC) chip, and signals to/from a number of CDIC chips (if included) can be aggregated by an interface integrated circuit (IFIC) chip. In certain exemplary embodiments, each BFIC chip supports four beam forming elements (i.e., each BFIC includes a common port and four RF ports), although alternative embodiments can support other numbers of beam forming elements (e.g., two, four, eight, etc.). Signals to/from groups of BFIC chips can be aggregated to a single IFIC chip optionally through a network of interconnected CDIC chips. In certain exemplary embodiments, each CDIC chip supports connections to two BFIC chips or other to two other CDIC chips (i.e., each CDIC chip includes a common port and two RF ports), although alternative embodiments can support other numbers of connections (e.g., four, eight, etc.). In certain exemplary embodiments, each IFIC chip supports a single RF connection (i.e., each IFIC chip includes a common port and single RF port), although alternative embodiments can support other numbers of connections (e.g., two, four, eight, etc.). The BFIC chips, CDIC chips, and/or IFIC chips can be used to create different sized arrays and sub-arrays (e.g., having 64 beam forming elements or having 256 beam forming elements), and in some embodiments multiple sub-arrays are used to form larger arrays.

In certain exemplary embodiments, IFIC chips perform frequency translation (e.g., up/down conversion) between an intermediate frequency (IF) used on a common port and higher frequencies used on an RF port. For example, the IFIC chip may include a 4× multiplier using a 5.65 GHz reference signal for up/down converting the signals by approximately 22.6 GHz. When the IFIC chip is in the transmit mode, the transmit signal from the IF side is up-converted to a higher frequency range used by the RF side, and when the IFIC chip is in the receive mode, the receive signal from the RF side is down-converted to the lower-frequency range used by the IF side. In certain exemplary embodiments, the IF side operates in approximately the 4.875-5.725 GHz frequency range, while the RF side operates in approximately the 27.5-28.35 GHz frequency range.

In certain exemplary embodiments, CDIC chips perform signal conditioning and distribution, which, among other things, can provide scalability to larger arrays, provide flexibility to adjust gain distribution to optimize RF parameters, can allow for relaxation of gain requirements on the BFIC chips in order to lower risk of ripple and oscillation, and can allow for phase adjustment across sub-arrays.

Thus, one exemplary embodiment includes a chipset including BFIC chips, CDIC chips, and/or IFIC chips that can be used in various combinations in order to produce various array and sub-array configurations. In exemplary embodiments, the three types of chips (CDIC, BFIC and IFIC) can be combined in a modular fashion and in combination they can create arbitrary arrays of any form factor and size. In typical situations, there are many antenna elements and thus many BFICs, but only a small number of CDIC and/or IFIC chips. The ability to form arbitrary arrays is very useful for 5G arrays such as those used for base station, consumer premise equipment, and user equipment (such cell phones).

It should be noted that each type of RFIC can include a transmit signal path and/or a receive signal path to allow for transmit-only, receive-only, or dual-mode configurations.

It also should be noted that one or more of the RFIC types may include temperature compensation (Temp Comp) circuitry to adjust the gain of the transmit and receive signals as a function of temperature based on inputs from a temperature sensor. For example, temperature compensation circuitry may include a digital attenuator that is controlled based on the sensed temperature such that when temperature decreases such that the gain would increase, attenuation is increased in order provide the desired amount of gain, and when temperature increases such that gain would decrease, attenuation is decreased in order to provide the desired amount of gain. FIG. 5 shows temperature compensation circuitry in a BFIC chip for performing temperature compensation on the transmit signal prior to distribution to the four RF signal paths during transmit mode and for performing temperature compensation on the combined receive signal from the four RF signal paths during receive mode. CDIC and/or IFIC chips can include similar temperature compensation circuitry. Temperature compensation can be performed, for example, using variable attenuators (e.g., digital attenuators) that are controlled based on the sensed temperature or by adjusting the gain of the transmit and receive RF amplifiers based on the sensed temperature.

Generally, each RFIC includes a set of registers for controlling operational parameters such as gain and phase parameters (sometimes referred to as "beam weights" or "complex beam weights"). In certain exemplary embodiments, the common port and each RF port of each RFIC may be configured for two or more RF channels, e.g., to support multiple transmit/receive signals or polarizations. In this case, the set of registers generally includes operational parameters for each of the RF channels. The AESA system 10 generally includes a controller that configures the operational parameters of the RFICs.

Figure 10:
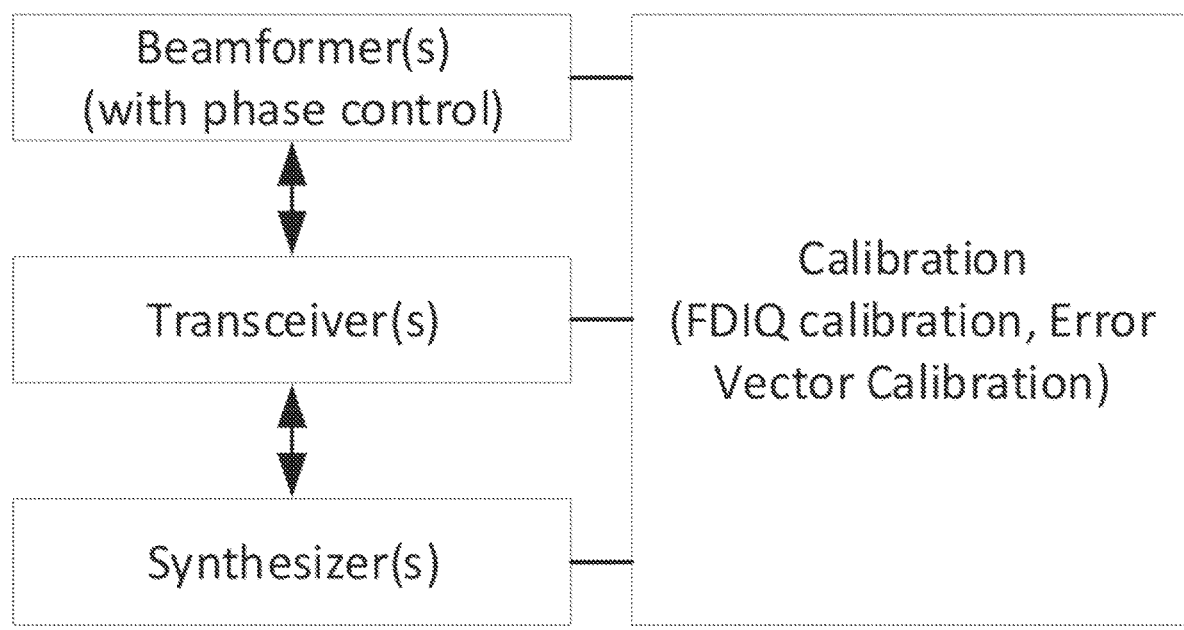
FIG. 10 is a schematic diagram of an integrated beamforming integrated circuit in accordance with various embodiments.

In certain embodiments, a beamforming integrated circuit integrates beamforming circuitry, transceiver circuitry, synthesizer circuitry, a frequency-dependent quadrature (FDIQ) calibration system, and an error vector calibration system on a single chip for analog, hybrid, or digital beamforming. FIG. 10 is a schematic diagram of an integrated beamforming integrated circuit in accordance with various embodiments. Incorporating these two calibrations on-chip is expected to vastly improve overall performance of the beamforming integrated circuit by among other things compensating for frequency-dependent quadrature (I/Q) imbalances and time-varying phase changes due to environmental factors in an integrated and coordinated manner.

Certain exemplary embodiments incorporate an FDIQ calibration system of the type described below as well as in commonly-owned provisional patent application no. 63/187,645 filed May 12, 2021 and patent application Ser. No. 17/741,907 filed May 11, 2022, each of which is hereby incorporated herein by reference, although it should be noted that other types of FDIQ calibration systems can be additionally or alternatively used.

In certain exemplary embodiments of an FDIQ calibration system, a joint transmit/receive image compensation system uses blind adaptive calibration to adapt receive image compensation coefficients when the system is online in a receive mode and to adapt transmit image compensation coefficients when the system is online in a transmit mode. Importantly, the receive coefficients must be converged before the transmit coefficients can be adapted because adapting the transmit coefficients during the transmit mode relies on the receive signal path being able to compensate for receiver-generated images such that images present during the online transmit mode would be attributable to the transmit signal path. In this way, the system can dynamically adapt both the receive and transmit image compensation coefficients dynamically on an ongoing or constant basis by adapting the receive coefficients when the system is operating in the receive mode and by adapting the transmit coefficients when the system is operating in the transmit mode. Such a joint transmit/receive image compensation system can be used in a wide variety of communication systems and devices including, for example and without limitation, AESA systems and RFICs of the types described herein.

Figure 6:
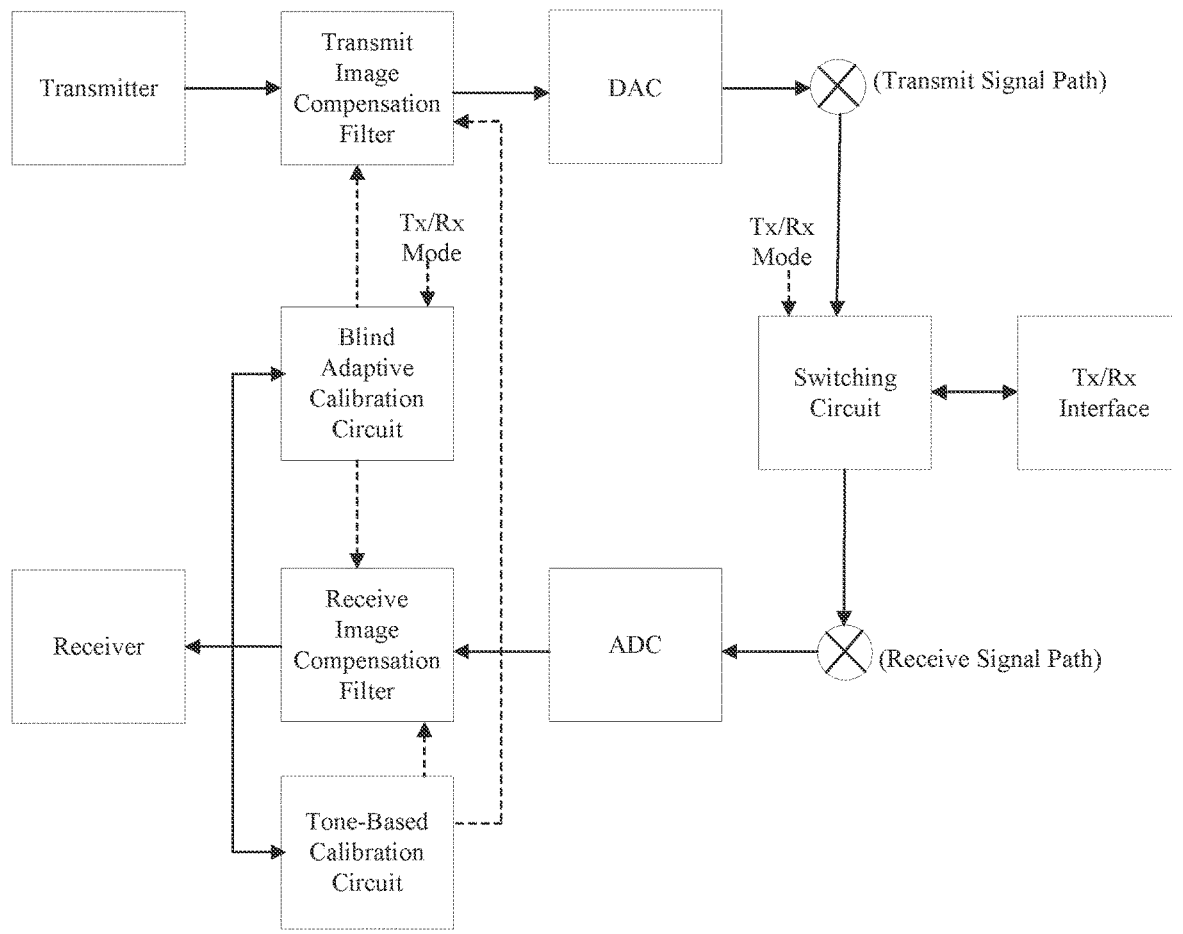
FIG. 6 is a schematic block diagram showing relevant components of a joint transmit/receive image compensation system, in accordance with various exemplary embodiments.

FIG. 6 is a schematic block diagram showing relevant components of a joint transmit/receive image compensation system, in accordance with various exemplary embodiments. Among other things, the system includes a transmit signal path for generating transmit signals, a receive signal path for processing receive signals, and a switching circuit for selectively coupling the receive signal path either to a receive interface (e.g., through which signals are received such as from an antenna or other communication circuit) or to the transmit signal path (i.e., a loopback path through which the receive signal path receives the signals generated by the transmit signal path). Among other things, the transmit signal path comprises a transmitter for generating transmit signals, a transmit image compensation filter for filtering images from the transmit signals, and a digital-to-analog converter (DAC) for converting digital signals to analog signals such as for transmission over a transmit interface that in turn may be connected to an antenna or other transmit circuit. Among other things, the receive signal path comprises an analog-to-digital converter (ADC) for converting analog signals to digital signals, a receive image compensation filter for filtering images from the receive signals, and a receiver for processing the filtered receive signals. As discussed above, the receive signals provided to the receive signal path may come from the receive interface or may come from the transmit signal path looped back via the switching circuit, e.g., depending on whether the system is in a transmit mode or a receive mode. The transmit interface and the receive interface may be a common interface as depicted in FIG. 6 or may be separate interfaces. The system also includes a blind adaptive calibration circuit for joint transmit/receive image compensation and optionally includes a tone-based calibration circuit, as discussed more fully below.

Figure 7:
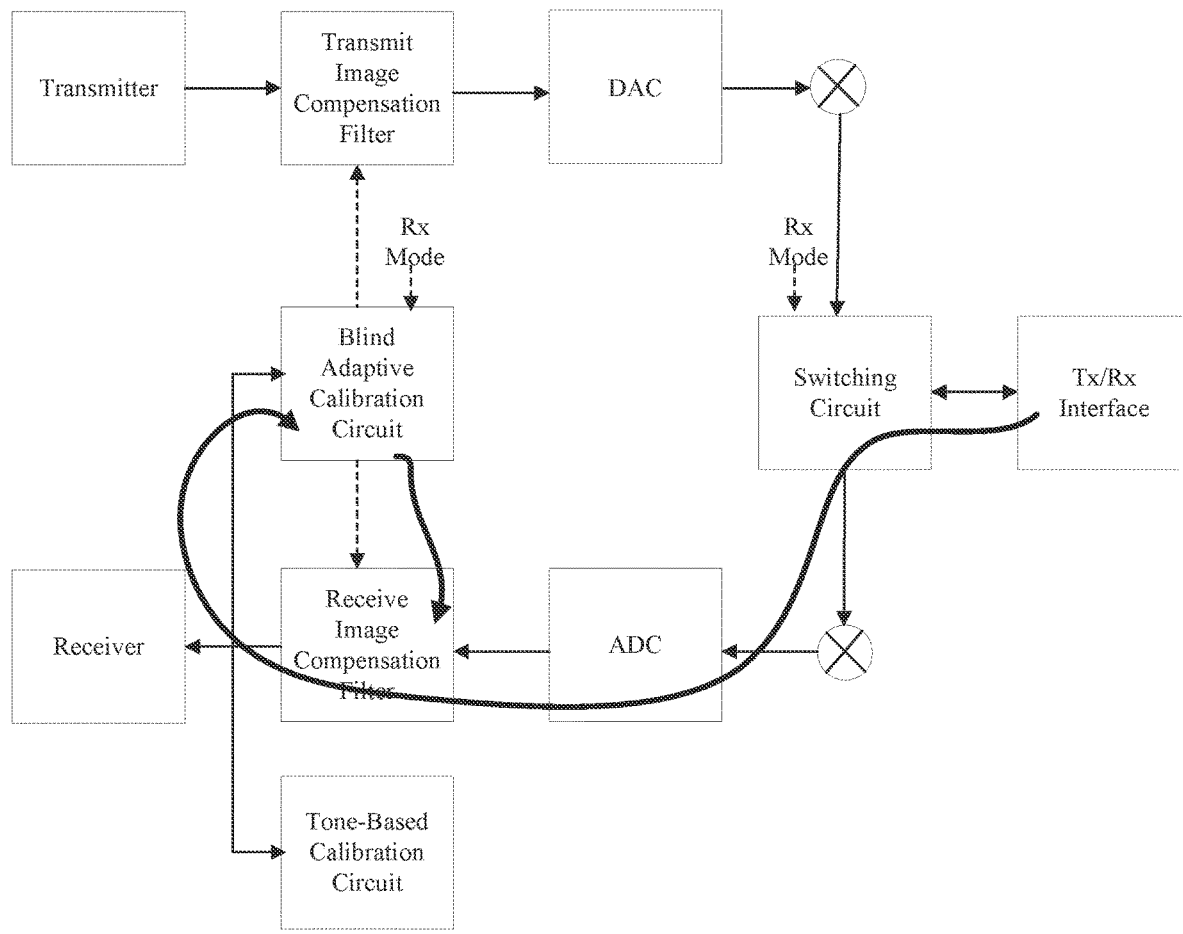
FIG. 7 is a schematic block diagram depicting an online receive calibration mode, in accordance with various exemplary embodiments.
Figure 8:
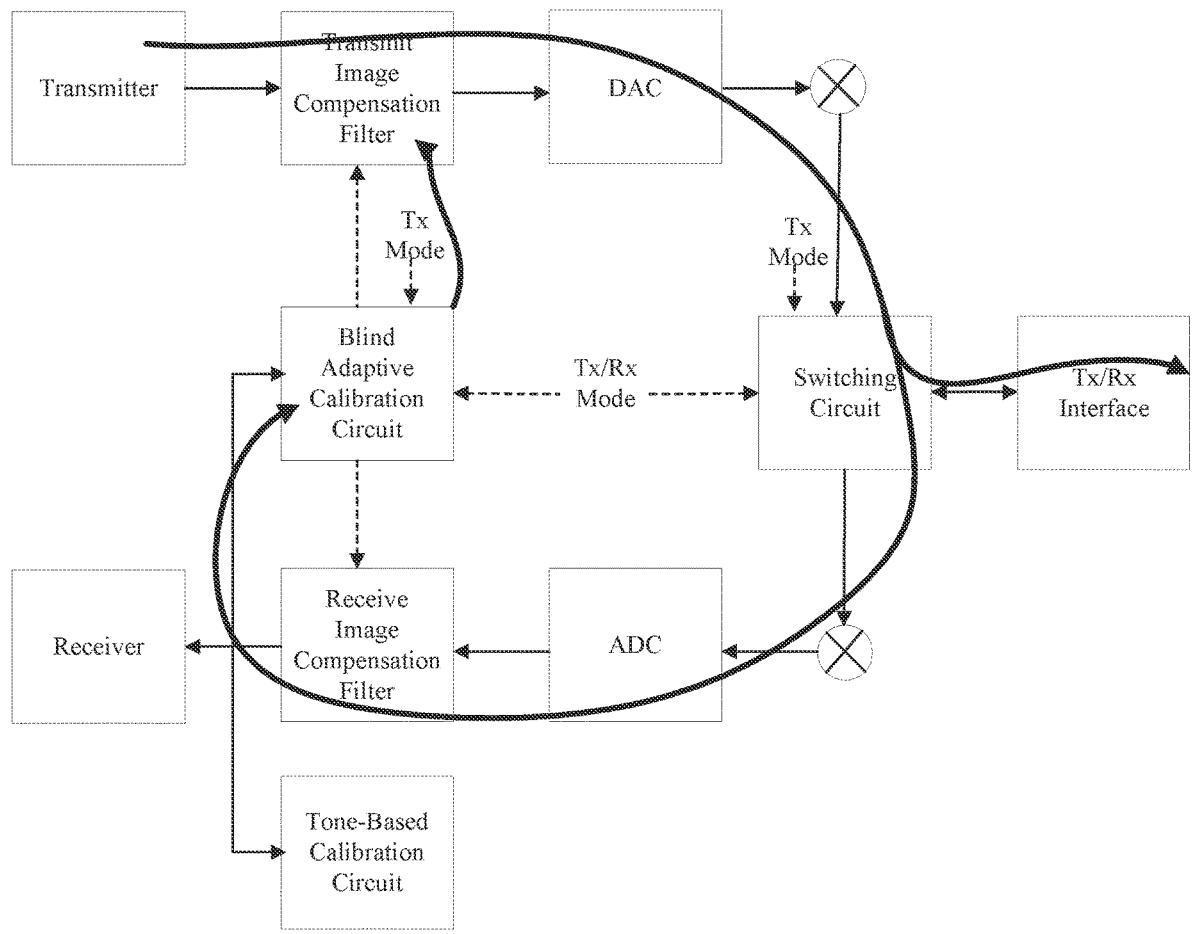
FIG. 8 is a schematic block diagram depicting an online transmit calibration mode, in accordance with various exemplary embodiments.

In various exemplary embodiments, the system includes an online receive calibration mode in which the receive signal path is coupled via the switching circuit to the receive interface and the blind adaptive calibration circuit adapts the receive image compensation coefficients based on "live" signals received from the receive interface (e.g., receive signals from a 5G communication system or phased array system), as depicted schematically in FIG. 7, and also includes an online transmit calibration mode in which the receive signal path is coupled via the switching circuit to the transmit signal path (i.e., looped back) and the blind adaptive calibration circuit adapts the transmit image compensation coefficients based on "live" signals from the transmit signal path, which also may be provided to the transmit interface, as depicted schematically in FIG. 8. As discussed above, in various exemplary embodiments, when the system is online and operating in the receive mode, then the system is placed in the online receive calibration mode for adapting the receive coefficients and when the system is online and operating in the transmit mode, then the system is placed in the online transmit calibration mode for adapting the transmit coefficients provided that there has been convergence of the receive coefficients.

Figure 9:
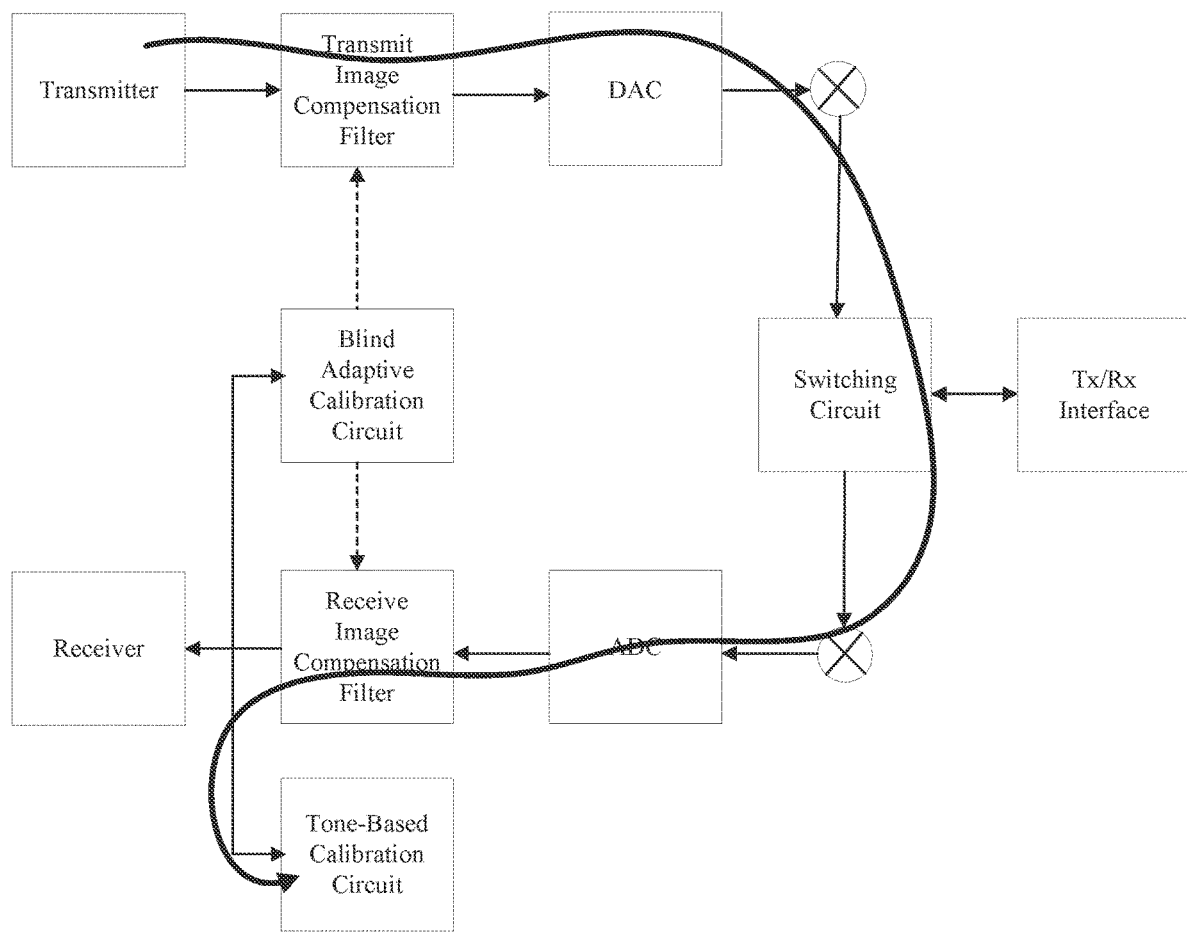
FIG. 9 is a schematic block diagram depicting an offline calibration mode, in accordance with various exemplary embodiments.

Generally speaking, the system must initialize or "bootstrap" convergence of the receive coefficients. One way to accomplish such initialization is by initially placing the system in the receive mode and adapting the receive coefficients based on receive signals (which can be "live" data or even noise). Another way to accomplish such initialization is by initially placing the system in an "offline" calibration mode in which the receive coefficients (and optionally also the transmit coefficients) are adapted using a tone-based or other "offline" calibration technique, which generally involves looping the transmit signal path to the receive signal path and having the transmit signal path generate various tones that can be used to characterize images and adapt image compensation coefficients, as depicted schematically in FIG. 9. Once the receive coefficients are converged, the system can be placed into an "online" mode during which the corresponding coefficients are adapted, e.g., if the system is placed in the transmit mode then the transmit coefficients are adapted and if the system is placed in the receive mode then the receive coefficients are adapted.

It should be noted that, by adapting the receive and transmit image compensation coefficients on an ongoing basis while the transceiver is online and being switched between the receive mode and transmit mode, embodiments employing such joint transmit/receive image compensation may adapt to image changes over time such as from environmental changes such as temperature, voltage, etc.

In the online transmit calibration mode, the transmit signals from the transmit path may be provided to the blind adaptive calibration circuit through a 0 degree path or through a 90 degree path; it generally would not be necessary to provide the signals alternatively through both paths. It should be noted that joint transmit/receive image compensation may be used in both direct conversion systems and IF-to-I/Q conversion systems.

Certain exemplary embodiments incorporate an FDIQ calibration system of the type described below as well as in a commonly-owned provisional patent application no. 63/466,529 entitled FLEXIBLE CALIBRATION OF TIME-VARYING OPERATING PARAMETERS IN RF COMMUNICATION SYSTEMS AND DEVICES SUCH AS FOR ERROR VECTOR CONTROL IN PHASED ARRAY SYSTEMS AND DEVICES filed May 15, 2023, which is hereby incorporated herein by reference, although it should be noted that other types of FDIQ calibration systems can be additionally or alternatively used.

Certain exemplary embodiments of an error vector calibration system compensate for time-varying operating parameters such as phase or gain parameters without requiring complex control systems and re-calibration and without taking the RF communication device/system offline by storing primary calibration parameters that essentially represent a default or nominal set of calibration parameters (e.g., calibrated based on known environmental factors such as temperature, voltage, frequency etc.) and secondary calibration parameters for making calibration adjustments based on changes in one or more environmental factors. The primary calibration parameters may be determined, for example, during initial device/system calibration such as during manufacturing or initial device certification. The secondary calibration parameters may be determined at the same time as the initial calibration parameters and in any case may be stored such as in a look-up table (LUT), e.g., indexed by environmental factor such as temperature, voltage, frequency, etc. In certain embodiments, secondary calibration parameters can be obtained based on a combination of two or more environmental factors such as based on a combination of temperature and voltage, e.g., using multidimensional or nested tables. From time to time, the RF communication device/system may recalibrate the operating parameters using a set of secondary calibration parameters selected based on the then-existing state of environmental factor(s).

Figure 11:
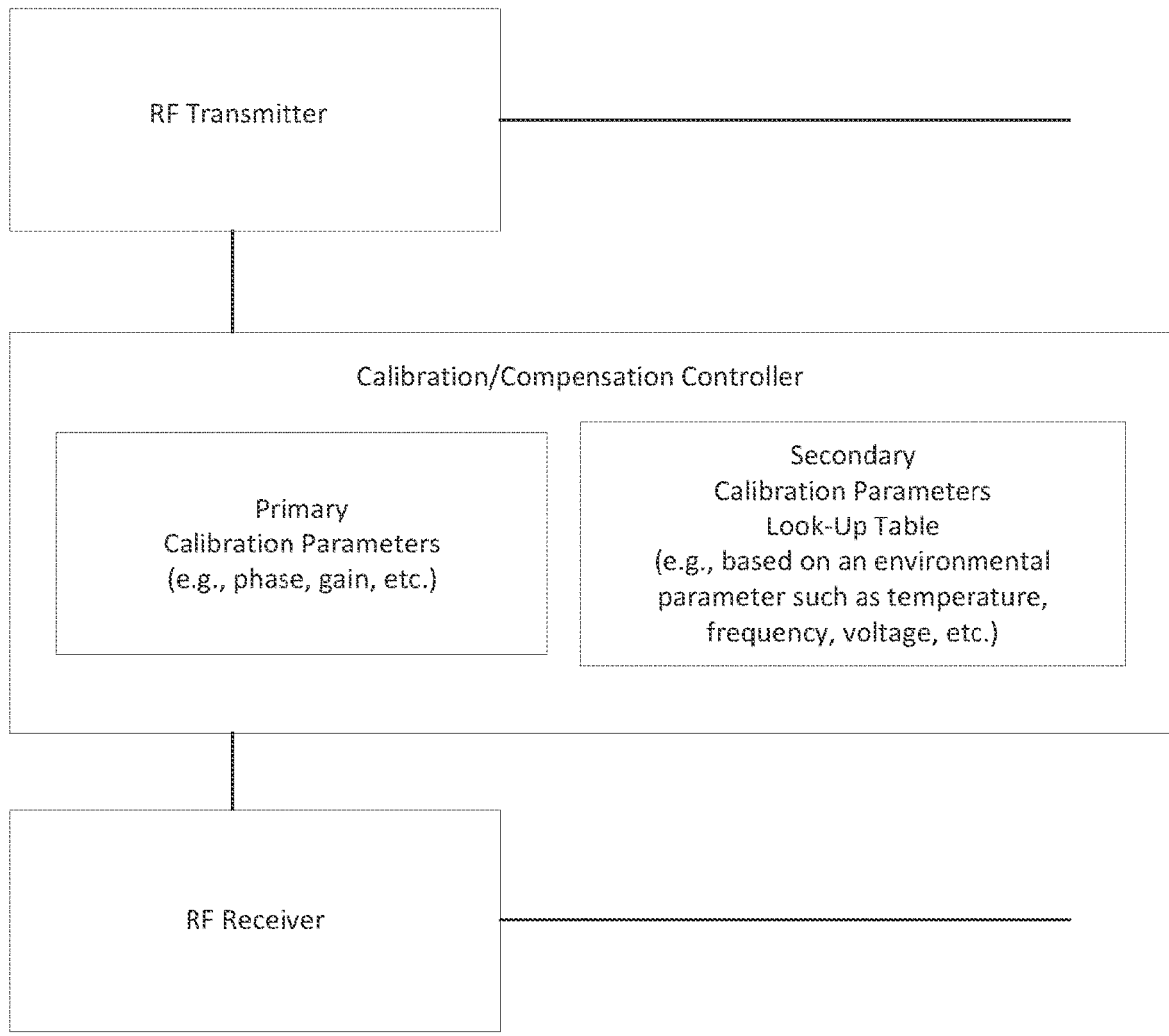
FIG. 11 is a schematic diagram showing an RF communication device/system in accordance with one exemplary embodiment.

FIG. 11 is a schematic diagram showing an RF communication device/system in accordance with one exemplary embodiment. Among other things, the RF communication device/system includes a transmitter, a receiver, and a calibration/compensation controller that can compensate for time-varying operating parameters using a LUT to set calibration parameters or make calibration adjustments. Such a calibration/compensation controller can be used in RF communication devices/systems that utilize 5G protocols, although it should be noted that embodiments are not in any way limited to 5G protocols and can be used more generally to perform time-varying operating parameter compensation in a wide range of devices/systems.

Figure 12:
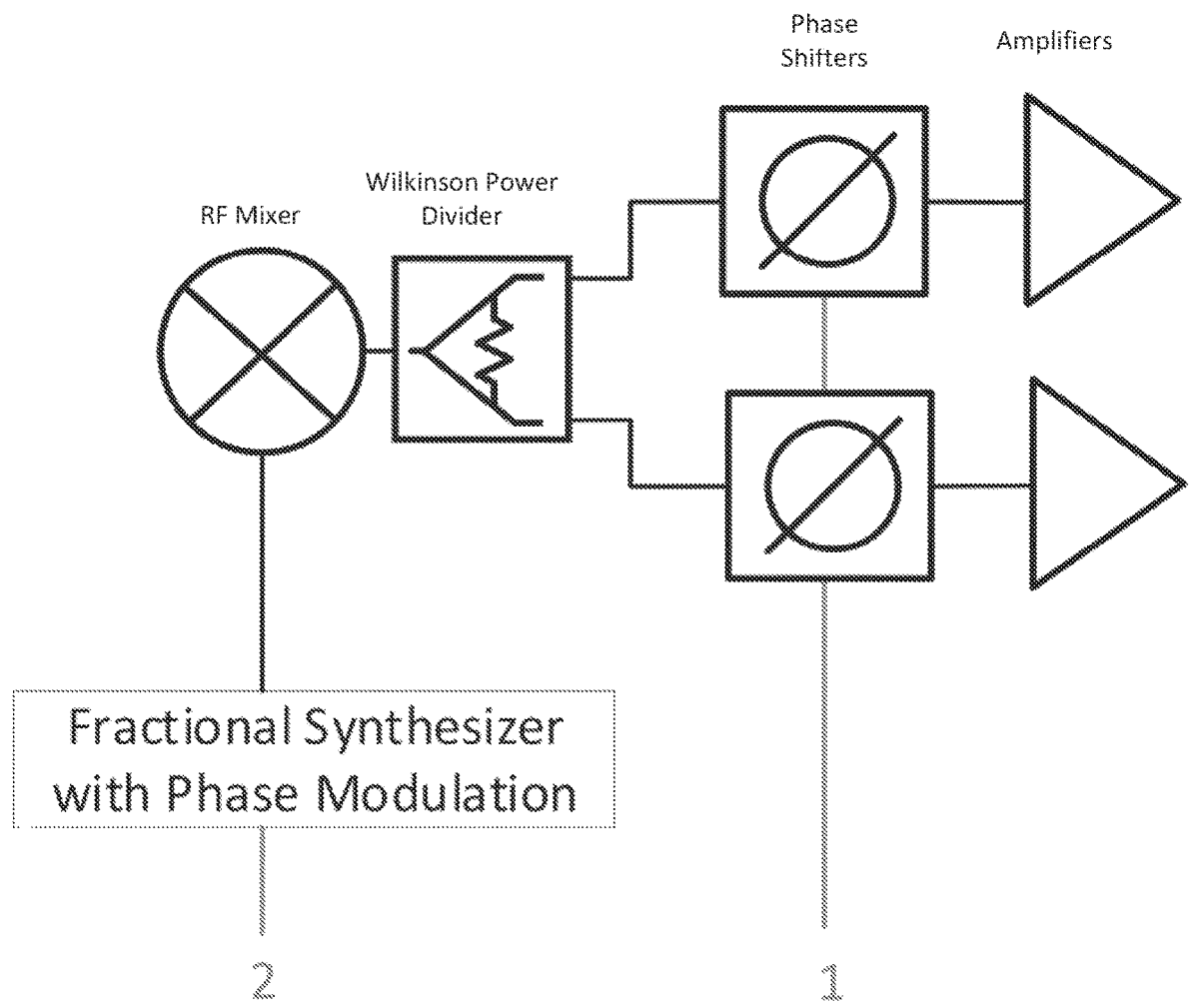
FIG. 12 is a schematic diagram of an RF transmitter circuit in which phase is controlled using primary and secondary calibration parameters as discussed with reference to FIG. 11 in accordance with one exemplary embodiment.

In certain exemplary embodiments, errors relating to phase and/or amplitude are controlled using existing phase shifters and synthesizer inputs using the above-described scheme without requiring complex control systems and re-calibration. FIG. 12 is a schematic diagram of an RF transmitter circuit in which phase is controlled using primary and secondary calibration parameters as discussed with reference to FIG. 11 in accordance with one exemplary embodiment, although it should be noted that similar concepts can be applied equally to a receiver. Among other things, the RF transmitter circuit includes a mixer that modulates a carrier signal to produce a modulated signal and distribution network (e.g., a Wilkinson power divider in this example) that distributes the modulated signal to multiple beamforming signal paths, each beamforming signal path including in this example a phase shifter for adjusting the phase of the signal such as for beamforming and a variable-gain amplifier for amplifying the signal for transmission such as over a corresponding phased array antenna element. It should be noted that embodiments can include any number of beamforming signal paths, e.g., a beamforming integrated circuit might include two, four, or eight beamforming signal paths.

Phase and/or amplitude performance initially can be measured using either (1) external test equipment or (2) an internal feedback receiver to determine primary operating parameters that are programmed into the transmitter at point 1 shown in FIG. 12 along with beamforming phase/amplitude settings (e.g., phase differences may be programmed as phase offsets into the phase shifters). For example, if the top beamforming signal path shown in FIG. 12 measured at a phase offset of 0° and the bottom beamforming signal path shown in FIG. 12 measured at a phase offset of 50°, then the bottom beamforming signal path might be programmed with a primary phase offset of −50° in order to equalize it with the top beamforming signal path (e.g., a phase offset of −50° might be applied to any beamforming phase setting provided to the bottom beamforming signal path).

Then, in order to compensate for time-varying phase operation, any variations in the mixer/LO path due to changes in environmental factor such as temperature, voltage, frequency, etc. can be either calibrated or compensated using look-up tables and programmed into the synthesizer at point 2 shown in FIG. 12.

Figure 13:
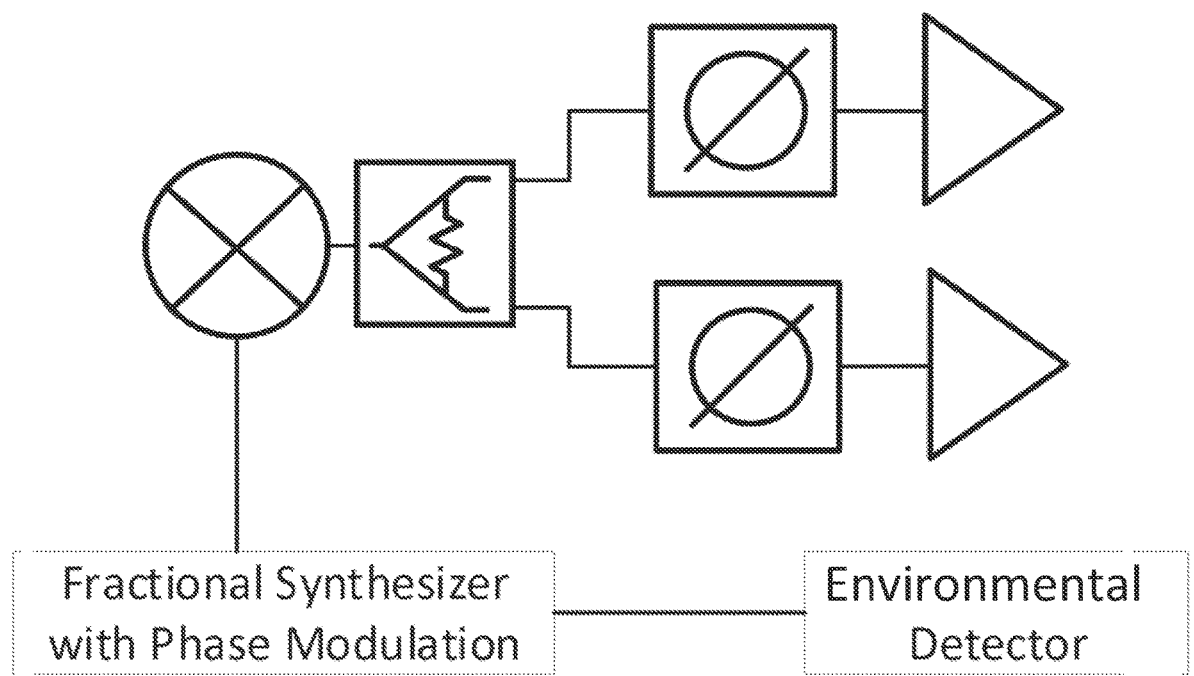
FIG. 13 is a schematic diagram of an RF transmitter circuit including an integral environmental detector, in accordance with one exemplary embodiment.

As shown schematically in FIG. 13, the RF communication device/system may include one or more environmental detectors such as a temperature detector, a voltage detector, a frequency detector, etc. to provide input to the calibration/compensation controller for selecting a set of secondary calibration parameters from the LUT. For example, RF integrated circuits such as beamforming integrated circuits may include a calibration/compensation controller and also may include one or more environmental detectors such as a temperature detector, which, among other things, would allow each such RF integrated circuit in a phased array system to independently compensate for variations in temperature and/or other environmental factor, as it is known that different RF ICs in a phased array system may be subjected to different temperatures and temperature variations over time.

Alternatively, data regarding environmental factors may be provided to the RF communication device/system by an external controller. Any variation that is not known a priori, e.g., not having been characterized in advance, may be measured using more traditional calibration techniques (e.g., using a feedback receiver, which might involve taking the RF communication device/system offline for calibration) with the results stored in the LUT for later use. Thus, for example, the RF communication device/system could use more traditional calibration techniques to "learn" calibration parameters on-the-fly but store values for later use so that such traditional calibration techniques do not need to be repeated, e.g., for a given temperature or temperature change.

Figure 15:
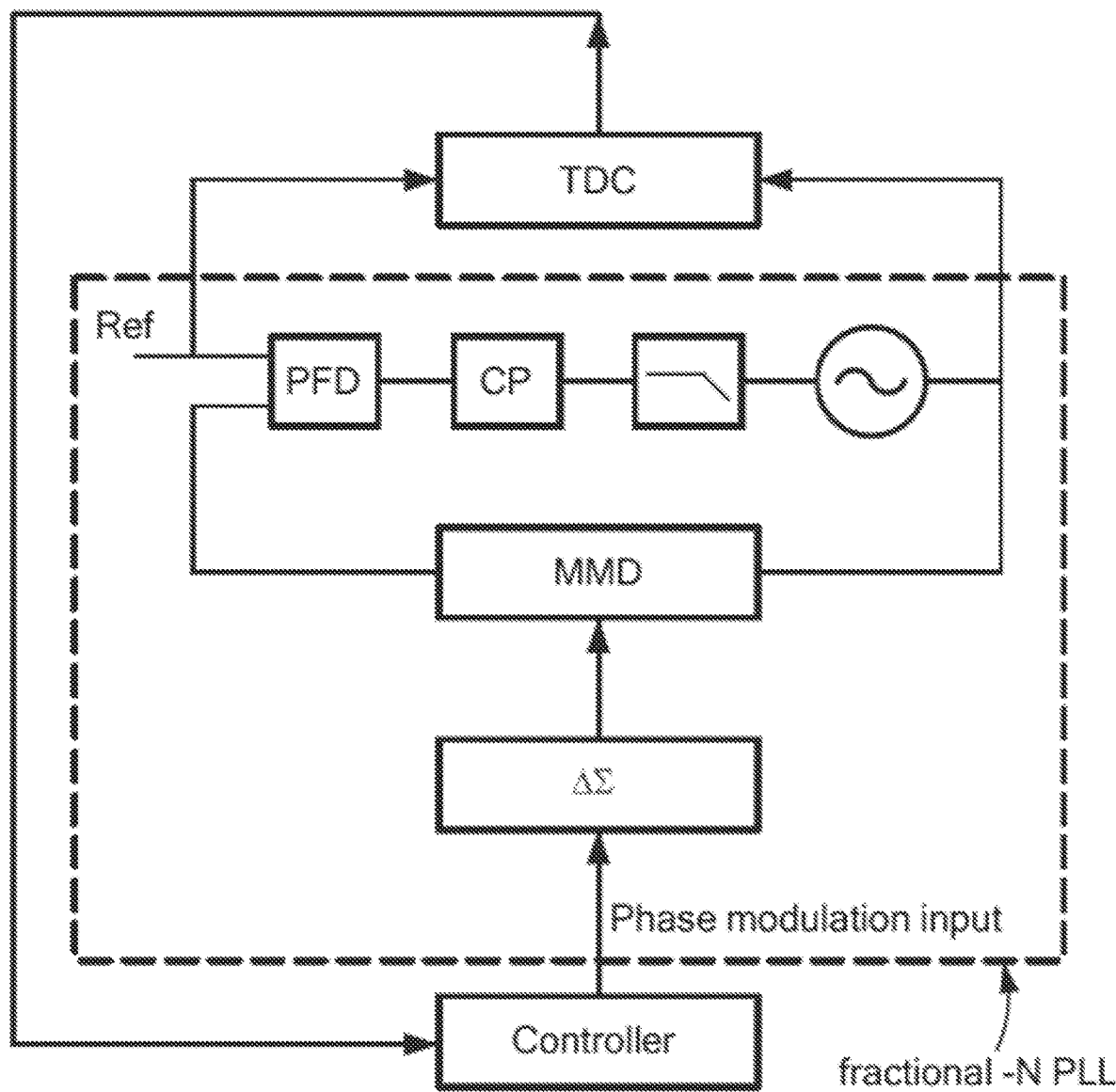
FIG. 15 is a schematic diagram showing details of a specific synthesizer circuit that can be used for both synchronizing the synthesizer with other synthesizers and to compensate for time-varying phase performance using mechanisms described herein.

In certain exemplary embodiments, point 2 shown in FIG. 12 may be a phase modulation input used for synchronizing multiple synthesizers, e.g., as disclosed in commonly-owned U.S. Published Patent Application No. 2021/0021402 published Jan. 21, 2021, which is hereby incorporated herein by reference in its entirety. FIG. 15 is a copy of FIG. 4 from this published patent application. Here, the synthesizer circuit includes a synthesizer in the form of a fractional-N delta sigma phase-locked loop (PLL) and a phase measurement circuit in the form of a time-to-digital (TDC) converter. The synchronization circuit here includes the existing delta sigma modulator and multiple modulus divider of the PLL, which are used to adjust the phase operation of the PLL based on the phase modulation input from the controller. The TDC has two inputs, one input coupled to a common reference signal and the other input coupled to the PLL output signal. At various times, the TDC measures the time difference between the reference signal and the PLL output signal and provides one or more time measurements, which can be stored in a digital register and/or provided to an internal or external controller, e.g., via a bus interface. The controller uses the time measurement(s) to determine a synthesizer adjustment value, which, in this example is a phase modulation adjustment (e.g., a negative time adjustment) that is fed into the existing delta sigma in the PLL as a phase modulator input for adjusting the operation of the PLL to align the phase of the PLL to the phase of the common reference signal, although in other exemplary embodiments, the phase modulation adjustment can be provided to any phase modulation port of the synthesizer. The time-varying phase compensation value from the look-up table discussed above can be combined with this phase modulation adjustment used to synchronize the synthesizers, e.g., by summing the two adjustments to form a combined phase modulation input to the delta sigma modulator.

Figure 14:
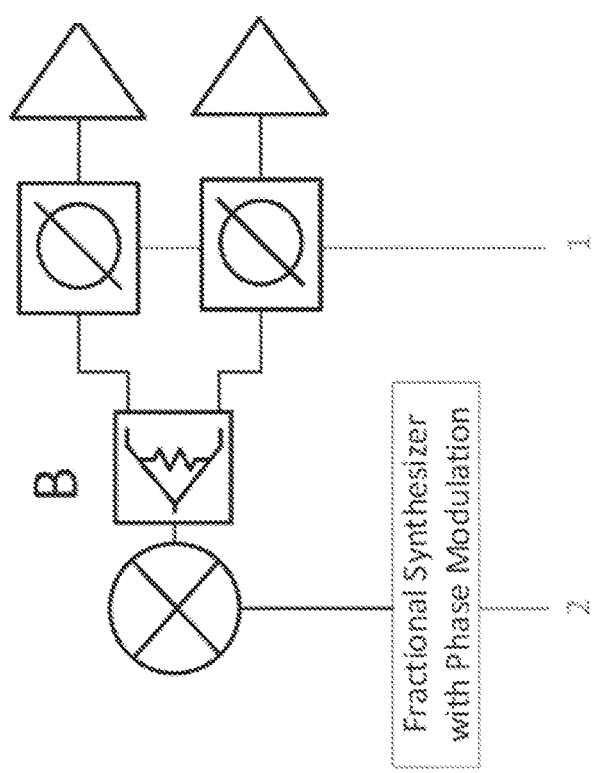
FIG. 14 is a schematic diagram of an RF communication device/system having multiple transmitters and/or receivers in which calibration involves measuring characteristics of all of the transmitters (or receivers) relative to one of them and then making corrections at point 1, e.g., so that all of the transmitters (or receivers) are synchronized with regard to a particular operating parameter (e.g., phase, amplitude, etc.) and then the average phase can be measured relative to an external reference and used to make corrections at point 2.
Figure 14:
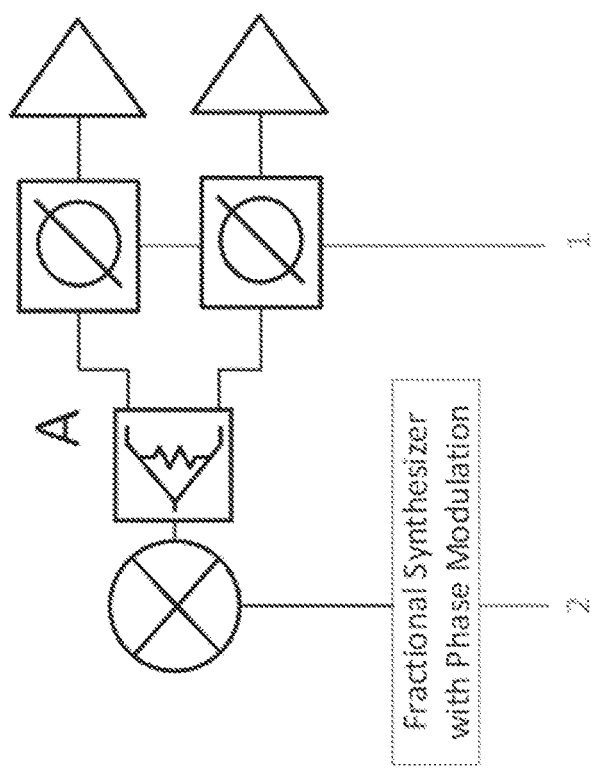

As depicted schematically in FIG. 14, in an RF communication device/system having multiple transmitters and/or receivers, calibration could involve measuring characteristics of all of the transmitters (or receivers) relative to one of them and then making corrections at point 1, e.g., so that all of the transmitters (or receivers) are synchronized with regard to a particular operating parameter (e.g., phase, amplitude, etc.). The average phase then can be measured relative to an external reference, and this can be used to make corrections at point 2.

Various embodiments of the invention may be implemented at least in part in any conventional computer programming language. For example, some embodiments may be implemented in a procedural programming language (e.g., "C"), or in an object-oriented programming language (e.g., "C++"). Other embodiments of the invention may be implemented as a pre-configured, stand-alone hardware element and/or as preprogrammed hardware elements (e.g., application specific integrated circuits, FPGAS, and digital signal processors), or other related components.

In alternative embodiments, the disclosed apparatus and methods (e.g., as in any flow charts or logic flows described above) may be implemented as a computer program product for use with a computer system. Such implementation may include a series of computer instructions fixed on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as a tangible, non-transitory semiconductor, magnetic, optical or other memory device, and may be transmitted using any communications technology, such as optical, infrared, RF/microwave, or other transmission technologies over any appropriate medium, e.g., wired (e.g., wire, coaxial cable, fiber optic cable, etc.) or wireless (e.g., through air or space).

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

Computer program logic implementing all or part of the functionality previously described herein may be executed at different times on a single processor (e.g., concurrently) or may be executed at the same or different times on multiple processors and may run under a single operating system process/thread or under different operating system processes/threads. Thus, the term "computer process" refers generally to the execution of a set of computer program instructions regardless of whether different computer processes are executed on the same or different processors and regardless of whether different computer processes run under the same operating system process/thread or different operating system processes/threads. Software systems may be implemented using various architectures such as a monolithic architecture or a microservices architecture.

Importantly, it should be noted that embodiments of the present invention may employ conventional components such as conventional computers (e.g., off-the-shelf PCs, mainframes, microprocessors), conventional programmable logic devices (e.g., off—the shelf FPGAs or PLDs), or conventional hardware components (e.g., off-the-shelf ASICs or discrete hardware components) which, when programmed or configured to perform the non-conventional methods described herein, produce non-conventional devices or systems. Thus, there is nothing conventional about the inventions described herein because even when embodiments are implemented using conventional components, the resulting devices and systems (e.g., an integrated beamforming integrated circuit) are necessarily non-conventional because, absent special programming or configuration, the conventional components do not inherently perform the described non-conventional functions.

The activities described and claimed herein provide technological solutions to problems that arise squarely in the realm of technology. These solutions as a whole are not well-understood, routine, or conventional and in any case provide practical applications that transform and improve computers and computer routing systems.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Various inventive concepts may be embodied as one or more methods, of which examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Although the above discussion discloses various exemplary embodiments of the invention, it should be apparent that those skilled in the art can make various modifications that will achieve some of the advantages of the invention without departing from the true scope of the invention. Any references to the "invention" are intended to refer to exemplary embodiments of the invention and should not be construed to refer to all embodiments of the invention unless the context otherwise requires. The described embodiments are to be considered in all respects only as illustrative and not restrictive.

What is claimed is:

1. An integrated circuit (IC) comprising:
   a beamforming circuitry;
   a transceiver circuitry coupled to the beamforming circuitry;
   a synthesizer circuitry coupled to the transceiver circuitry;
   a frequency-dependent quadrature (FDIQ) calibration system configured to compensate for frequency-dependent quadrature (I/Q) imbalances in at least one of the beamforming circuitry, the transceiver circuitry or the synthesizer circuitry due to at least one environmental factor; and
   an error vector (EV) calibration system configured to compensate for time-varying phase changes in at least one of the beamforming circuitry, the transceiver circuitry or the synthesizer circuitry due to the at least one environmental factor.

2. The IC of claim 1, wherein the at least one environmental factor includes temperature, voltage, or frequency.

3. The IC of claim 1, wherein the at least one environmental factor includes temperature and voltage.

4. The IC of claim 1, wherein the at least one environmental factor includes a combination of two or more environmental factors.

5. The IC of claim 1, wherein the FDIQ calibration system comprises a blind adaptive calibration circuit to adapt receive image compensation coefficients.

6. The IC of claim 5, wherein transmit signals from a transmit path are provided to the blind adaptive calibration circuit through a 0 degree path or a 90 degree path.

7. The IC of claim 1, wherein the EV calibration system stores a primary phase calibration parameter for programming an initial phase setting and stores secondary phase calibration parameters for making phase calibration adjustments based on changes in the at least one environmental factor.

8. The IC of claim 7, wherein the transceiver circuitry comprises:
   a plurality of RF communication circuits, each having a phase shifter; and
   a mixer that modulates a carrier signal to produce a modulated signal that is distributed to the plurality of RF communication circuits, wherein:
      the phase shifter of each RF communication circuit is programmed with a primary calibration parameter for calibration of the respective RF communication circuit;
      the mixer is programmed with a primary calibration parameter for calibration of the mixer based on phase outputs of the plurality of RF communication circuits; and
      at least one of (a) a phase shifter of one of the plurality of RF communication circuits or (b) the mixer is reprogrammed using the secondary calibration parameters based on changes of the at least one environmental factor.

9. The IC of claim 8, wherein the mixer is calibrated based on an average phase difference of the plurality of RF communication circuits relative to an external reference.

10. The IC of claim 1, wherein the transceiver circuitry comprises a plurality of transceivers that are compensated independently or collectively.

11. A method of calibrating an integrated circuit comprising a beamforming circuit, a transceiver circuit, and a synthesizer circuit, the method comprising:
    compensating for frequency-dependent quadrature (I/Q) imbalances in at least one of the beamforming circuit, the transceiver circuit or the synthesizer circuit due to at least one environmental factor; and
    compensating for time-varying phase changes in at least one of the beamforming circuit, the transceiver circuit or the synthesizer circuit due to the at least one environmental factor.

12. The method of claim 11, wherein the at least one environmental factor includes temperature, voltage, or frequency.

13. The method of claim 11, wherein the compensating for frequency-dependent quadrature (I/Q) imbalances occurs via a frequency-dependent quadrature (FDIQ) calibration system comprising a blind adaptive calibration circuit to adapt receive image compensation coefficients.

14. The method of claim 11, wherein the transmitting of the transmit signal via the transmit signal path occurs through a 0 degree path or a 90 degree path.

15. The method of claim 12, wherein the compensating for time-varying phase changes occurs via an error vector (EV) calibration system that stores a primary phase calibration parameter for programming an initial phase setting and secondary phase calibration parameters for making phase calibration adjustments based on changes in the at least one environmental factor.

16. A wireless communication system comprising:
    a beamforming integrated circuit (IC) comprising:
       a beamforming circuit;
       a transceiver circuit;
       a synthesizer circuit, and
       a combined calibration system configured for compensating frequency-dependent quadrature (I/Q) imbalances and time-varying phase changes in the beamforming IC due to at least one environmental factor.

17. The wireless communication system of claim 16, wherein the combined calibration system comprises:
    a frequency-dependent quadrature (FDIQ) calibration system configured to compensate for the frequency-dependent quadrature (I/Q) imbalances; and
    an error vector (EV) calibration system configured to compensate for the time-varying phase changes.

18. The wireless communication system of claim 16, wherein the at least one environmental factor includes temperature, voltage, or frequency.

19. The wireless communication system of claim 17, wherein the FDIQ calibration system comprises a blind adaptive calibration circuit to adapt receive image compensation coefficients.

20. The wireless communication system of claim 17, wherein the EV calibration system is configured to store a primary phase calibration parameter for programming an initial phase setting and secondary phase calibration parameters for making phase calibration adjustments based on changes in the at least one environmental factor.

* * * * *